United States Patent
Lindquist et al.

(10) Patent No.: US 10,896,213 B2
(45) Date of Patent: Jan. 19, 2021

(54) INTERFACE FOR A DISTRIBUTED NETWORK SYSTEM

(71) Applicant: Google LLC, Mountain View, CA (US)

(72) Inventors: Daniel Lindquist, Cupertino, CA (US); Siddharth Doshi, Mountain View, CA (US)

(73) Assignee: Google LLC, Mountain View, CA (US)

( * ) Notice: Subject to any disclaimer, the term of this patent is extended or adjusted under 35 U.S.C. 154(b) by 267 days.

(21) Appl. No.: 15/914,949

(22) Filed: Mar. 7, 2018

(65) Prior Publication Data

US 2019/0347356 A1 Nov. 14, 2019

(51) Int. Cl.
| | | |
|---|---|---|
| G06F 17/00 | (2019.01) | |
| G06F 16/332 | (2019.01) | |
| G06F 16/2457 | (2019.01) | |
| G06F 3/16 | (2006.01) | |
| G10L 15/18 | (2013.01) | |
| G10L 25/03 | (2013.01) | |

(52) U.S. Cl.
CPC .......... *G06F 16/3326* (2019.01); *G06F 3/167* (2013.01); *G06F 16/24578* (2019.01); *G10L 15/1822* (2013.01); *G10L 25/03* (2013.01)

(58) Field of Classification Search
CPC .......... G06F 3/167; G06F 16/61; G06F 21/10; G06F 2221/0708; G06F 2221/0773; G06F 21/32
See application file for complete search history.

(56) References Cited

U.S. PATENT DOCUMENTS

| | | | |
|---|---|---|---|
| 2008/0005068 A1 | 1/2008 | Dumais et al. | |
| 2008/0071544 A1 | 3/2008 | Beaufays et al. | |
| 2014/0222436 A1 | 8/2014 | Binder et al. | |
| 2015/0127637 A1* | 5/2015 | Cavanagh | ......... G06F 16/24578 707/723 |
| 2017/0092278 A1 | 3/2017 | Evermann et al. | |
| 2017/0110130 A1 | 4/2017 | Sharifi et al. | |
| 2017/0110144 A1 | 4/2017 | Sharifi et al. | |
| 2017/0132019 A1 | 5/2017 | Karashchuk et al. | |
| 2017/0237801 A1* | 8/2017 | Baluja | ................... H04L 67/325 709/217 |
| 2017/0358301 A1 | 12/2017 | Raitio et al. | |

FOREIGN PATENT DOCUMENTS

WO    WO-02/31814 A1    4/2002

OTHER PUBLICATIONS

"Walmart and Google to offer voice-enabled shopping", BBC News, Aug. 23, 2017 (10 pages).

(Continued)

*Primary Examiner* — Truong V Vo
(74) *Attorney, Agent, or Firm* — Foley & Lardner LLP; James De Vellis (57) ABSTRACT

The present disclosure is generally directed to a data processing system for customizing content in a voice activated computer network environment. The data processing system can provide an improved voice-based interface by selected response attributes based on response weightings. The selection of predetermined attributes can reduce size of response data and reduce network transmissions by providing more succinct audio-based responses.

20 Claims, 4 Drawing Sheets

(56) References Cited

OTHER PUBLICATIONS

Abrams, Help users find, interact & re-engage with your app on the Google Assistant, Google Developers Blog, Nov. 15, 2017, 16 pages.
Albrecht, "Alexa, How Can You Be Used in Restaurants?", the spoon, Dec. 10, 2017, 6 pages.
Amazon, "Echo Look | Hands-Free Camera and Style Assistant", reprinted from https://www.amazon.com/gp/product/B0186JAEWK?ref%5F=cm%5Fsw%5Fr%5Ffa%5Fdp%5Ft2%5FC5oazbJTKCB18&pldnSite=1 on Aug. 22, 2017 (7 pages).
Barr, "AWS DeepLens—Get Hands-On Experience with Deep Learning With Our New Video Camera", AWS News Blog, Nov. 29, 2017, 11 pages.
Broussard, Mitchel, "Chatbot-Like Siri Patent Includes Intelligent Image, Video, and Audio Recognition within Messages", MacRumors, May 11, 2017 (7 pages).
Buckland et al., "Amazon's Alexa Takes Open-Source Route to Beat Google Into Cars", Bloomberg, Feb. 27, 2018, 6 pages.
Chen, Lulu Yilun, "Alibaba Challenges Google, Amazon With New Echo-Like Device", Bloomberg Technology, Jul. 5, 2017 (3 pages).
Clover, Juli, "Amazon and Google Want to Turn Their Smart Home Speakers Into Telephone Replacements", MacRumors, Feb. 15, 2017 (5 pages).
Coberly, "Apple patent filing reveals potential whispering Siri functionality", Techspot, Dec. 14, 2017, 4 pages.
Collins, et al., "Can Twitter Save Itself?", cnet, Apr. 26, 2017, reprinted from https://www.cnet.com/news/twitter-q1-2017-earnings/ on Aug. 22, 2017 (2 pages).
Crist, Ry, "Logitech Harmony's Alexa Skill just got a whole lot better", cnet, Jul. 13, 2017 (2 pages).
Estes, "Amazon's Newest Gadget is a Tablet That's Also an Echo", Gizmodo, Sep. 19, 2017, 3 pages.
Foghorn Labs, 10 Tips to Improve the Performance of Google Product Listing Ads, printed from Internet address: http://www.foghornlabs.com/2012/11/21/product-listing-ads-best-practices/, on Mar. 18, 2013, 5 pages.
Forrest, Conner, "Essential Home wants to be bridge between Amazon's Alexa, Apple's Siri, and Google Assistant", TechRepublic, May 31, 2017 (10 pages).
Foxx, Chris, "Apple reveals HomePod smart speaker", BBC News, Jun. 5, 2017 (6 pages).
Gebhart, Andrew, "Google Assistant is spreading, but it needs its own Echo Dot", cnet, May 20, 2017 (7 pages).
Gebhart, Andrew, "Google Home to the Amazon Echo: 'Anything you can do . . . '", cnet, May 18, 2017 (7 pages).
Gibbs, Samuel, "Your Facebook Messenger app is about to be filled with ads", The Guardian, Jul. 12, 2017 (3 pages).
Golgowski, Nina, "This Burger King Ad Is Trying to Control Your Google Home Device", Huffpost, Apr. 12, 2017 (7 pages).
Google Developers, "GoogleAssistant SDK" reprinted from https://developers.google.com/assistant/sdk/ on Aug. 22, 2017 (4 pages).
Google Inc., Products Feed Specification, printed from Internet address: http://www.support.google.com/merchants/bin/answer.py?hl=en&answer=188494#US, on Mar. 18, 2013, 6 pages.
Google Inc., Supported File Formats, printed from Internet address: http://www.support.google.com/merchants/bin/answer.py?hl=en&answer=160567, on Mar. 18, 2013, 1 page.
Gurman, et al., "Apple is Manufacturing a Siri Speaker to Outdo Google and Amazon", Bloomberg, May 31, 2017 (5 pages).
Hardwick, Tim, "Facebook Smart Speaker Coming Next Year With 15-inch Touch Panel", MacRumors, Jul. 25, 2017 (5 pages).
Heater, "Amazon Alexa devices can finally tell voices apart", TechCrunch, Oct. 11, 2017, 6 pages.
Johnston, "Amazon Whirlwind: New Echo, Plus, Spot, Connect, Fire TV Take the Stage", Twice, Sep. 27, 2017, 4 pages.
Kelion, "Amazon revamps Echo smart speaker family", BBC News, Sep. 27, 2017, 11 pages.
Kelion, Leo, "Amazon's race to make Alexa smarter", BBC News, Jul. 28, 2017 (8 pages).
Koetsier, John, "Ads on Amazon Echo: Wendy's, ESPN, and Progressive Among Brands Testing", Forbes, May 11, 2017 (2 pages).
Krishna, "Jim Beam's smart decanter will pour you a shot when you ask", engadget, Nov. 29, 2017, 3 pages.
Lacy, "Improving search and advertising are the next frontiers for voice-activated devices", TechCrunch, Dec. 20, 2017, 13 pages.
Larson, Selena, "Google Home now recognizes your individual voice", CNN Money, San Francisco, California, Apr. 20, 2017 (3 pages).
Lee, "Take Two for Samsung's troubled Bixby assistant", BBC News, Oct. 19, 2017, 6 pages.
Lee, Dave, "The five big announcements from Google I/O", BBC News, May 18, 2017 (9 pages).
Lund, Pamela, Mastering Google Product Feeds and Product Listing Ads $2013 Part 1, found at http://www.blueglass.com/blog/mastering-google-product-feeds-and-product-listing-ads-part-1/#comments, Dec. 28, 2013, 17 pages.
Nieva, Richard, "Google Home and eBay can tell you how much that's worth", cnet, Mar. 8, 2017 (3 pages).
Novet, et al., "Amazon is getting ready to bring Alexa to work", CNBC, Nov. 29, 2017, 4 pages.
Palladino, "Garmin teamed up with Amazon to make a tiny Echo Dot for your car", ars Technica, Oct. 17, 2017, 2 pages.
Patently Apple, "Apple Patent Reveals a New Security Feature Coming to Siri", Apr. 4, 2017, reprinted from http://www.patentlyapple.com/patently-apple/2017/04/apple-patent-reveals-a-new-security-feature-coming-to-siri.html, on Aug. 22, 2017 (6 pages).
Patently Mobile, "The Patent behind Google Home's new Feature of Understanding Different Voices in the Home Surfaced Today", Apr. 20, 2017, reprinted from http://www.patentlymobile.com/2017/04/the-patent-behind-google-homes-new-feature-of-understanding-different-voices-in-the-home-surfaced-today.html, on Aug. 22, 2017 (3 pages).
Perez, "Alexa's 'Routines' will combine smart home control with other actions, like delivering your news and weather", TechCrunch, Sep. 28, 2017, 10 pages.
Perez, Sarah, "The first ad network for Alexa Skills shuts down following Amazon's policy changes", Tech Crunch, Jun. 15, 2017 (6 pages).
Porter, Jon, "Amazon Echo Show release date, price, news and features", Techradar, Jun. 26, 2017 (14 pages).
Pringle, "'I'm sorry to hear that': Why training Siri to be a therapist won't be easy", CBC News, Sep. 24, 2017, 3 pages.
Purcher, Jack, Today Google Home's Virtual Assistant can learn its Owner's voice for Security Reasons like Apple's Patent Pending Idea, Apr. 20, 2017, 4 pages.
Sablich, Justin, "Planning a Trip With the Help of Google Home", New York Times, May 31, 2017 (6 pages).
Seifert, Dan, "Samsung's new virtual assistant will make using your phone easier", The Verge, Mar. 20, 2017 (6 pages).
Sherr, Ian, "IBM built a voice assistant for cybersecurity", cnet, Feb. 13, 2017 (2 pages).
Siegal, Daniel, "IP Attys Load Up Apps' Legal Challenges at 'Silicon Beach'", Law360, Los Angeles, California, Feb. 2, 2017 (4 pages).
Unknown Author, "'Dolphin' attacks fool Amazon, Google voice assistants", BBC News, Sep. 7, 2017, 8 pages.
Willens, Max, "For publishers, Amazon Alexa holds promise but not much money (yet)", Digiday, Jul. 6, 2017 (6 pages).
Hattori, Shun, "Context-Aware Query Refinement for Mobile Web Search," Proceedings of the 2007 International Symposium on Applications and the Internet Workshops. 2007 (4 pages).
International Search Report and Written Opinion on PCT Application PCT/US2018/049782 dated Nov. 26, 2018.
International Preliminary Report on Patentability, Ch. I, for PCT Appln. Ser. No. PCT/US2018/049782 dated Sep. 17, 2020 (10 pages).

* cited by examiner

INTERFACE FOR A DISTRIBUTED NETWORK SYSTEM

BACKGROUND

Voice-based interfaces can sequentially provide options, data, and other information to users. A user's limited ability to remember each of the items in a sequential list can cause excessive network transmissions as the user requests the information to be repeated or requests follow up questions. Excessive network transmissions, packet-based or otherwise, of network traffic data between computing devices can prevent a computing device from properly processing the network traffic data, completing an operation related to the network traffic data, or responding timely to the network traffic data. Excessive transmission of network traffic data can also complicate data routing or degrade the quality of the response if the responding computing device is at or above its processing capacity, which may result in inefficient bandwidth utilization.

SUMMARY

According to at least one aspect of the disclosure, a system to provide digital components in a voice-activated system can include a natural language processor component, a content selector component, an audio signal generation component that are executed by a data processing system. The data processing system can receive, via an interface, a first input audio signal. The data processing system can parse the first input audio signal to identify a first search request in the first input audio signal. The data processing system can select a plurality of search results based on the first search request. The data processing system can determine a search context for the first search request. The data processing system can select a plurality of attributes for each of the plurality of search results. The data processing system can determine a first weighting for the plurality of attributes for each of the plurality of search results based on the search context. The data processing system can determine a second weighting for the plurality of attributes for each of the plurality of search results based on a client device context. The data processing system can select, for each of the plurality of search results, an attribute from the plurality of attributes based on the first weighting for the plurality of attributes for each of the plurality of search results and the second weighting for the plurality of attributes for each of the plurality of search results. The data processing system can generate a digital component that comprises a data structure having, for each of the plurality of search results, the attribute selected from each of the plurality of attributes based on the first weighting for the plurality of attributes for each of the plurality of search results and the second weighting for the plurality of attributes for each of the plurality of search results. The data processing system can transmit, via the interface, the digital component to a client device in response to the input audio signal.

According to at least one aspect of the disclosure, a method to provide digital components in a voice-activated system can include receiving, by a natural language processor component executed by a data processing system and via an interface of the data processing system, a first input audio signal. The method can include parsing, by the natural language processor component, the first input audio signal to identify a first search request in the first input audio signal. The method can include selecting, by a content selector component executed by the data processing system, a plurality of search results based on the first search request. The method can include determining, by an attribute selector component executed by the data processing system, a search context for the first search request. The method can include selecting, by the attribute selector component, a plurality of attributes for each of the plurality of search results. The method can include determining, by the attribute selector component, a first weighting for the plurality of attributes for each of the plurality of search results based on the search context. The method can include determining, by the attribute selector component, a second weighting for the plurality of attributes for each of the plurality of search results based on a client device context. The method can include selecting, by the attribute selector component and for each of the plurality of search results, an attribute from the plurality of attributes based on the first weighting for the plurality of attributes for each of the plurality of search results and the second weighting for the plurality of attributes for each of the plurality of search results. The method can include generating, by an audio signal generator component executed by the data processing system, a digital component that comprises a data structure having, for each of the plurality of search results, the attribute selected from each of the plurality of attributes based on the first weighting for the plurality of attributes for each of the plurality of search results and the second weighting for the plurality of attributes for each of the plurality of search results. The method can include transmitting, by the audio signal generator via the interface, the digital component to a client device in response to the input audio signal.

These and other aspects and implementations are discussed in detail below. The foregoing information and the following detailed description include illustrative examples of various aspects and implementations and provide an overview or framework for understanding the nature and character of the claimed aspects and implementations. The drawings provide illustration and a further understanding of the various aspects and implementations and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Following below are more detailed descriptions of various concepts related to, and implementations of, methods, apparatuses, and systems for attribute selection for data structures in packetized audio signals. The various concepts introduced above and discussed in greater detail below may be implemented in any of numerous ways.

The present disclosure is generally directed to the customization of responses in a voice-activated computer network environment. The voice interfaces of devices in a voice-activated computer network can sequentially present results as lists. Sequentially providing results to a user can require the user to remember each of the results in the list as the voice interface provides the full list of results and each of the results associated attributes. It can be difficult for the user to remember the full list of results which can result in increased network and computer usage as the results list is repeatedly provided to the user.

Rather than sending all attributes associated with each of the results, the systems and methods of the present disclosure can select, for each of the results in the list, one or more attributes that are relevant to a client device context or search context. The inclusion of specific attributes (as opposed to a full listing of attributes) can reduce network utilization as less data is sent to the client device. Providing the selected, relevant attributes to the user with search results can also enable the user to distinguish and remember the results of the results list, which can reduce the number of times the results list is repeated to the user. Reducing the number of times the results are rendered to the user can also save network and computational resources.

Figure 1:
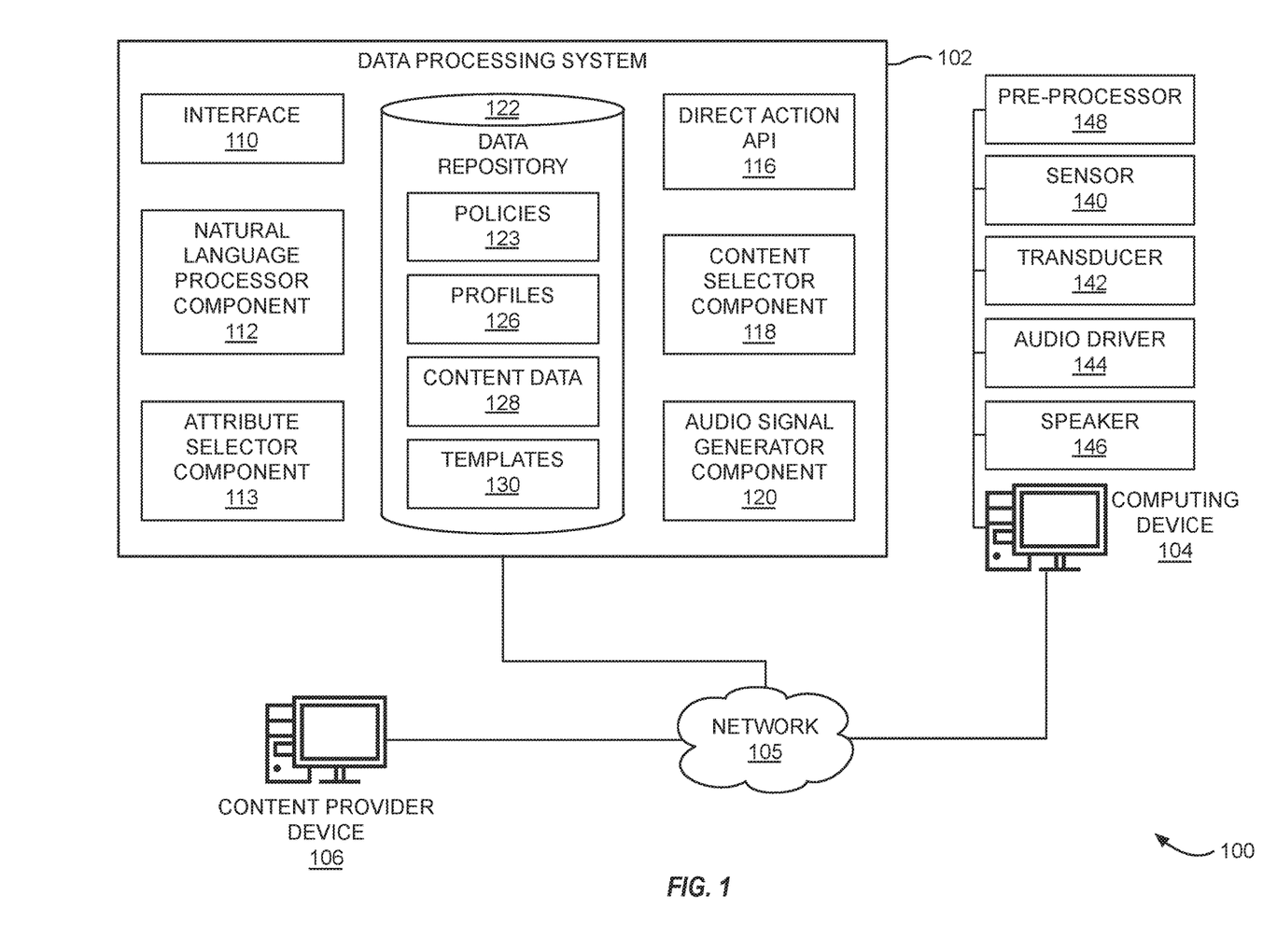
FIG. 1 illustrates an example system to customize content in a voice-activated data packet (or other protocol) based computer network environment.

FIG. 1 illustrates an example system 100 to customize content in response to packetized audio signals in a voice activated data packet (or other protocol) based computer network environment. The system 100 can include at least one data processing system 102. The data processing system 102 can include at least one server having at least one processor. For example, the data processing system 102 can include a plurality of servers located in at least one data center or server farm. The data processing system 102 can determine from an input audio signal a request and a trigger keyword associated with the request. The data processing system's response to the request or the trigger can be user dependent. For example, the data processing system 102 can select different responses based on which user provided the input audio signal. The data processing system 102 can use voice recognition to determine which user provided the input audio signal. The data processing system 102 can respond to the request with one or more digital components that can include data structures with response data. The data structures can be incorporated into one or more audio files that when rendered provide an audio output or acoustic wave. The digital components can include other content formats (e.g., content in text, video, or image formats) in addition to audio-based content.

The data processing system 102 can include multiple, logically-grouped servers and facilitate distributed computing techniques. The logical group of servers may be referred to as a data center, server farm, or a machine farm. The servers can be geographically dispersed. A data center or machine farm may be administered as a single entity, or the machine farm can include a plurality of machine farms. The servers within each machine farm can be heterogeneous—one or more of the servers or machines can operate according to one or more type of operating system platform. The data processing system 102 can include servers in a data center that are stored in one or more high-density rack systems, along with associated storage systems, located for example in an enterprise data center. The data processing system 102 with consolidated servers in this way can improve system manageability, data security, the physical security of the system, and system performance by locating servers and high-performance storage systems on localized high-performance networks. Centralization of all or some of the data processing system 102 components, including servers and storage systems, and coupling them with advanced system management tools allows more efficient use of server resources, which saves power and processing requirements and reduces bandwidth usage.

The data processing system 102 can include at least one natural language processor (NLP) component 112, at least one interface 110, at least one attribute selector component 113, at least one content selector component 118, at least one audio signal generator component 120, at least one direct action application programming interface (API) 116, and at least one data repository 122. The NLP component 112, the interface 110, the attribute selector component 113, the content selector component 118, the audio signal generator component 120, and the direct action API 116 can each include at least one processing unit, server, virtual server, circuit, engine, agent, appliance, or other logic device, such as programmable logic arrays, configured to communicate with the data repository 122 and with other computing devices (e.g., the client computing device 104 or the content provider computing device 106) via the at least one computer network 105. The network 105 can include computer networks such as the internet, local, wide, metro, or other area networks, intranets, satellite networks, other computer networks such as voice or data mobile phone communication networks, and combinations thereof.

The network 105 can include a display network, e.g., a subset of information resources available on the internet that are associated with a content placement or search engine results system, or that are eligible to include third party digital components as part of a digital component placement campaign. The network 105 can be used by the data processing system 102 to access information resources such as web pages, web sites, domain names, or uniform resource locators that can be presented, output, rendered, or displayed by the client computing device 104. For example, via the network 105 a user of the client computing device 104 can access information or data provided by the content provider computing device 106.

The network 105 can include, for example a point-to-point network, a broadcast network, a wide area network, a local area network, a telecommunications network, a data communication network, a computer network, an Asynchronous Transfer Mode (ATM) network, a Synchronous Optical Network (SONET) network, a Synchronous Digital Hierarchy (SDH) network, a wireless network or a wireline network, and combinations thereof. The network 105 can include a wireless link, such as an infrared channel or satellite band. The topology of the network 105 may include a bus, star, or ring network topology. The network 105 can include mobile telephone networks using any protocol or protocols used to communicate among mobile devices, including advanced mobile phone protocol ("AMPS"), time division multiple access ("TDMA"), code-division multiple access ("CDMA"), global system for mobile communication ("GSM"), general packet radio services ("GPRS"), or universal mobile telecommunications system ("UMTS"). Different types of data may be transmitted via different protocols, or the same types of data may be transmitted via different protocols.

The client computing device 104 and the content provider computing device 106 can each include at least one logic device such as a computing device having a processor to communicate with each other or with the data processing system 102 via the network 105. The client computing device 104 and the content provider computing device 106 can each include at least one server, processor, or memory, or a plurality of computation resources or servers located in at least one data center. The client computing device 104 and the content provider computing device 106 can each include at least one computing device such as a desktop computer, laptop, tablet, personal digital assistant, smartphone, portable computer, thin client computer, virtual server, speaker-based assistant device, or other computing device.

The client computing device 104 can include at least one sensor 140, at least one transducer 142, at least one audio driver 144, at least one speaker 146, and at least one pre-processor 148. The sensor 140 can include a microphone or audio input sensor. The sensor 140 can also include at least one of a GPS sensor, proximity sensor, ambient light sensor, temperature sensor, motion sensor, accelerometer, or gyroscope. The transducer 142 can convert the audio input into an electronic signal. The audio driver 144 can include a script or program executed by one or more processors of the client computing device 104 to control the sensor 140, the transducer 142, or the audio driver 144, among other components of the client computing device 104, to process audio input or provide audio output. The speaker 146 can transmit (or render) the audio output signal.

The pre-processor component 148 can be coupled with the audio driver 144, the transducer 142, and the sensor 140. The pre-processor component 148 can be or include one or more processors that perform functions on received signals before the signals are transmitted to data processing system 102 or processed by other components of the client computing device 104. For example, the pre-processor component 148 can filter the input audio signals detected by the transducer 142 (or input audio signals that are otherwise received by the client computing device 104) to create a filtered input audio signal. The filtering by the pre-processor 148 can include filtering (or reducing) noise in the input audio signal, the amplification of predetermined frequencies in the input audio signal, the reduction of predetermined frequencies in the input audio signal, or up-sampling or down-sampling of the input audio signal. The pre-processor component 148 can convert the filtered input audio signal to data packets and transmit the data packets to the data processing system 102 via the network 105.

The client computing device 104 can be associated with an end user that enters voice-based search requests as audio input into the client computing device 104 (via the sensor 140 or transducer 142) and receives audio output in the form of a computer-generated voice that can be provided from the data processing system 102 (or the content provider computing device 106). The client computing device 104 can output the audio output from the speaker 146. The computer-generated voice can include recordings from a real person or computer-generated language. The audio output can be generated from an audio file that is generated and provided by the data processing system 102. The audio output can be generated from text or other data provided by the data processing system 102. For example, the client computing device 104 can include a text to voice processor that converts the text provided by the data processing system 102 into an audio output. The client computing device 104 can include a display and the response to the voice-based search request can include visual-based responses that can include images, graphics, movies, animations, displayed text, etc. The visual-based responses can supplement or replace the audio-based responses.

The content provider computing device 106 can provide audio-based digital components or other data for rendering by the client computing device 104 as an audio output digital component. The data can include an offer for a good or service. The data can include information about the content provider computing device 106. For example, the data can include hours of operation of a business associated with the content provider computing device 106, a location of the business, a list of qualifications, a list of services provided, a list of promotions, rating or rankings, or any combination thereof. The data processing system 102 can store the data provided by the content provider device 106 as content data 128 in the data repository 122. The data processing system 102 can retrieve the data and transmit the data to a client computing device 104. The data processing system 102 can select the digital audio components and provide (or instruct the content provider computing device 106 to provide) the digital audio components to the client computing device 104.

The data repository 122 can include one or more local or distributed databases and can include a database management system. The data repository 122 can include computer data storage or memory and can store one or more policies 123, profiles 126, content data 128, or templates 130 among other data. The content data 128 can include digital components or associated metadata as well as input audio messages that can be part of one or more communication sessions with the client computing device 104. The templates 130 can include data structures that can be used in communications with the client computing device 104. The templates 130 can include one or more place holders that the data processing system 102 can fill with, for example, content data 128, digital components, or other data. The profiles 126 can include preference data provided by the user of the client computing device 104.

The data processing system 102 can include an application, script or program installed at the client computing device 104, such as an app to communicate input audio signals to the interface 110 of the data processing system 102 and to drive components of the client computing device 104 to render output audio signals. The data processing system 102 can receive data packets or other signals that include or identify an input audio signal. For example, the data processing system 102 can execute or run the NLP component 112 to receive and process the input audio signal received from the client computing device 104.

The NLP component 112 can convert or parse the input audio signal into recognized text by comparing the input signal against a stored representative set of audio waveforms and choosing the closest matches. The representative waveforms can be generated across a large set of input signals. The user can provide some of the input signals. Once the audio signal is converted into recognized text, the NLP component 112 can match the text to words that are associated, for example via a learning phase, with actions that the system 100 can make. Via the transducer 142, the audio driver 144, or other components, the client computing device 104 can provide the input audio signal to the data processing system 102 (e.g., via the network 105) where it can be received (e.g., by the interface 110) and provided to the NLP component 112 or stored in the data repository 122 as content data 128.

The NLP component 112 can obtain the input audio signal. From the input audio signal, the NLP component 112 can identify at least one search request. The search request can include a trigger word (or phrase) and a request. The request can indicate intent or subject matter of the input audio signal. The trigger keyword can indicate a type of action likely to be taken. For an example input audio signal "I need a plumber," the NLP component 112 can parse the input audio signal to identify the trigger phrase as "I need" and the request as "plumber." The NLP component 112 can determine, based on the trigger phrase of "I need" that the user would like to perform a search for a "plumber," the request.

The content selector component 118 can select a plurality of responses based on the search request identified in the input audio signal. The content selector component 118 can select the responses from the data repository 122, where the responses can be stored as part of the content data 128. Continuing the above example, the content selector component 118 can select a plurality of search results based on the search request that the NLP component 112 identified. For example, the data processing system 102 can periodically perform web crawling to index and cache websites and other web-based content. The data processing system 102 can store the results of the indexing and caching in the data repository 122 as content data 128. The content selector component 118 can use the request ("plumber" in the above example) as a keyword to perform a search of the content data 128. Based on the search, the content selector component 118 can select a plurality of search results.

The content selector component 118 can select a search context for the search request. The content selector component 118 can assign a ranking to each of the search results based on the search context. The search context can be a geographic region or location, a search preference, a search history, a use history, or any combination thereof. For example, the content selector component 118 can use a geographic search context to select plumbers that are located within a predetermined distance of the client computing device 104. The search context can be determined by information included in the audio input. For example, when transmitted to the data processing system 102, the packetized audio input can include an IP address or other information that enables the data processing system 102 to determine a general region in which the client computing device 104 is located. The search context can be determined by information stored in the profiles 126. For example, the user of the client computing device 104 may have established a profile 126 with the data processing system 102 that provides the data processing system 102 with search preferences. The search context can be determined by information identified by the NLP component 112 in the input audio signal. For example, if the input audio signal is "Find me a plumber in New York City," the NLP component 112 can identify "in New York City" as a search context and limit the search results to plumbers in New York City.

The search for possible response data can be performed by a different data processing system 102. For example, the content selector component 118 can interface with a separate data processing system 102 that performs searches via the direct action API 116. The direct action API 116 can convert the search request and search context into a file format that can be transmitted to the searching data processing system 102. For example, the search request and search context can be converted into a JSON format or encoded URL with data identified as requested by the searching data processing system 102.

The data processing system 102 can include the attribute selector component 113. The attribute selector component 113 can determine, weight, rank, and select one or more attributes for each of the search results identified by the content selector component 118 (or returned from a separate searching data processing system 102) in response to the search request of the input audio signal. The attribute selector component 113 can select one or more attributes for each of the search results generate a data structure that includes the search results. The data structure can include, in association with each of the search results, the selected one or more attributes. For example, the data structure can be a JSON formatted file where the search results are included as an ordered list of objects. Each of the objects can include the one or more attributes.

The attributes can be characteristics, qualities, metadata or other information associated with a search result. For example, the attributes can include a store or other address, an offer, an opening time, a closing time, a license, a certificate, a service, a specialization, a capability, or a rating associated with the search result. For example and continuing the above example of a search for a plumber, the attributes can include the address of the plumber, an indication of whether the plumber is offering a promotion, an identification of the plumber's licenses or certifications, and an indication of whether the plumber is insured.

The attribute selector component 113 can gather the attributes for each of the search results during the indexing and caching process performed by the data processing system's web crawlers. For each potential search result that the web crawler processes, the web crawler can identify HTML tags or other metatags. For example, the owner web page that is crawled as a possible search result can indicate opening and closing times to the data processing system 102 by enclosing the opening and closing times in predetermined tags in the HTML of the web page. The attribute selector component 113 can process the text and other content of the possible search results with machine learning algorithms to identify the attributes. The data processing system 102 can also have an interface that enables the owner of the web page (e.g., the content provider device 106) to input attributes that the owner would like associate with a web page or search result.

The attribute selector component 113 can select one or more attributes for each of the search results to include in a data structure that is transmitted to the client computing device 104 for rendering to an end user. The data structure can be included in a digital component can be rendered to the end user at the client computing device 104 as an audio output signal. The attributes can be a mental anchor for the end user as each of the search results are audibly and sequentially presented to the user. To select a search result from the audio-based list, a user can provide a voice-based response that indicates the specific search result (e.g., "Ok, select Bob's Plumbing, Inc."), a position in the list of search results (e.g., "Ok, select the third plumber"), or the attribute (e.g., "Ok, select the plumber that is open all 24 hours a day"). For example, the attribute selector component 113 can select "open 24 hours a day" as an attribute for a first search result and "located 2 miles away" as an attribute for a second search result. In this example, the digital component rendered at the client computing device 104 in response to the user's input audio signal of "I need a plumber" can be "I found Plumber A, which is open 24 hours a day and Plumber B, which is located 2 miles away." The user may select one of the search result of Plumber A by providing a voice-based input of, for example, "Ok, select Plumber A" or "Ok, select the one open 24 hours a day."

The attribute selector component 113 can select which one or more attributes to include in a data structure that includes, for each search result, one or more selected attributes. The data structure can be incorporated into a digital component. The attribute selector component's selection of the attributes can be based on weightings of each of the different attributes. The attribute selector component 113 can select a first weighting based on the search context and can select second weighting based on a client device context. For each attribute, the attribute selector component 113 can use the weightings to generate a score for each of the respective attributes. The attribute selector component 113 can rank the attributes based on the score and select the attributes to include in the data structure based on the ranking. The search context weighting for a search results can be based on relevance of the attribute to the search request, uniqueness of the attribute (e.g., how many of the other search results have the same attribute), similarity of the attribute with other attributes, or a search result ranking. The weighting based on client device context can be based on preferences of the user provided the input audio signal to the client computing device 104 or based on the actions of a population of users. For example, the weighting based on the user search context can be based on defined user preferences, implied user preferences, past user selections, or client computing device 104 location information.

The attribute selector component 113 can remove one or more attributes from being associated with a search result if the attribute corresponds to the attribute of another search result. Attributes can correspond with one another when the values of the attributes substantially match one another (e.g., both attributes have a value of "Open 24 hours a day"), have values with a similar meaning but are not exact matches to one another (e.g., "Open 24 hours a day" and "Open all day, every day."), or are of the same type (e.g., "Open 24 hours a day" and "Open 9 to 5" can both be of the "hours of operation" type). The content selector component 118 can rank the search results. Based on the search result ranking, the attribute selector component 113 can select attributes for each of the search results. When removing attributes, the attribute selector component 113 can first select one or more attributes for the highest ranked search result before selecting attributes for the next highest ranked search result. Once the attribute selector component 113 selects an attribute for a search result, the attribute selector component 113 may not select the attributed selected for the higher ranked search result for a lower ranked search result. For example, assume that the search result for Plumber A and the search result for Plumber B both have the attribute "Open 24 hrs a day" as their respective highest ranked attribute and that the search result for Plumber A has a higher search ranking than the search result for Plumber B. In this example, the attribute selector component 113 may select "Open 24 hrs a day" as the attribute for Plumber A and a different attribute for Plumber B even though the selected attribute is a lower ranked attribute for the search result for Plumber B.

Rather than remove selected attributes, as the attribute selector component 113 progresses through the ranking of search results to select attributes for each of the search results, the attribute selector component 113 can apply a penalty (e.g., by applying a low or negative weighting or adjusting an existing weighting) to an attribute if the attribute was selected for a higher ranked search result. For example, if a business hours attribute was selected for the highest ranked search result, the business hours attribute of lower ranked search results may be given a penalty to reduce the likelihood the attribute will also be selected for lower ranked search results. As each attribute can have multiple weightings, the attribute selector component 113 can select attributes with penalties if the other weightings for the attribute are relatively high enough to compensate for the penalty.

For each search result, the attribute selector component 113 can combine the weightings to generate a score. The weightings can positively or negatively affect the score of the attribute. For example, to rank and select attributes for each of the search results that are salient to the user, the uniqueness of the attribute can positively affect the attribute's score. An attribute for a search result can be unique when other search results do have not the same attribute or have different values for the given attribute. For example, a location attribute for each of the search results for a plumber in a given city can be non-unique (or similar to one another) because each of the plumbers in the returned search results may be located in the same city or geographic area. A time attribute for a search result for a plumber can be unique, for example, if the attribute indicates that the plumber is open 24 hours a day and the time attribute for the other returned search results indicates that the respective plumbers' business hours between 9 AM and 5 PM.

The data processing system 102 can include the audio signal generator component 120. The audio signal generator component 120 can generate or otherwise obtain an output signal that includes or incorporates the data structure generated by the attribute selector component 113. The audio signal generator component 120 can incorporate the data structure into a digital component. The digital component can include the data structures that indicates the search results and the selected attributes for each of the respective search results. The interface 110 of the data processing system 102 can provide or transmit one or more data packets that include the digital component as an output signal via the computer network 105 to the client computing device 104. In some implementations, the data processing system 102 can transmit the data structure to the client computing device 104, which can incorporate the data structure into a digital component.

The data processing system 102 can provide the output signal from the data repository 122 or from the audio signal generator component 120 to the client computing device 104. The interface 110 can be a hardware interface, such as a network port data port, or wireless radio, that enables the data processing system 102 to receive and transmit data. The interface 110 can be graphical-based. For example, the interface 110 can be a graphical user interface that enables a user to input data or otherwise interact with the data processing system 102. The data processing system 102 can also instruct, via data packet transmissions, the content provider computing device 106 to provide the output signal to the client computing device 104. The output signal can be obtained, generated, transformed to, or transmitted as one or more data packets (or other communications protocol) from the data processing system 102 (or other computing device) to the client computing device 104.

The output signal that corresponds to the digital component, for example, an output signal that was obtained or generated by the audio signal generator component 120 transmitted via the interface 110 and the computer network 105 to the client computing device 104, can cause the client computing device 104 to execute the audio driver 144 to drive the speaker 146 to generate an acoustic wave corresponding to the output signal. The acoustic wave can include words corresponding to the digital component. When the digital component includes images or text, the client computing device 104 can display the images or text at a display of the client computing device 104.

Figure 2:
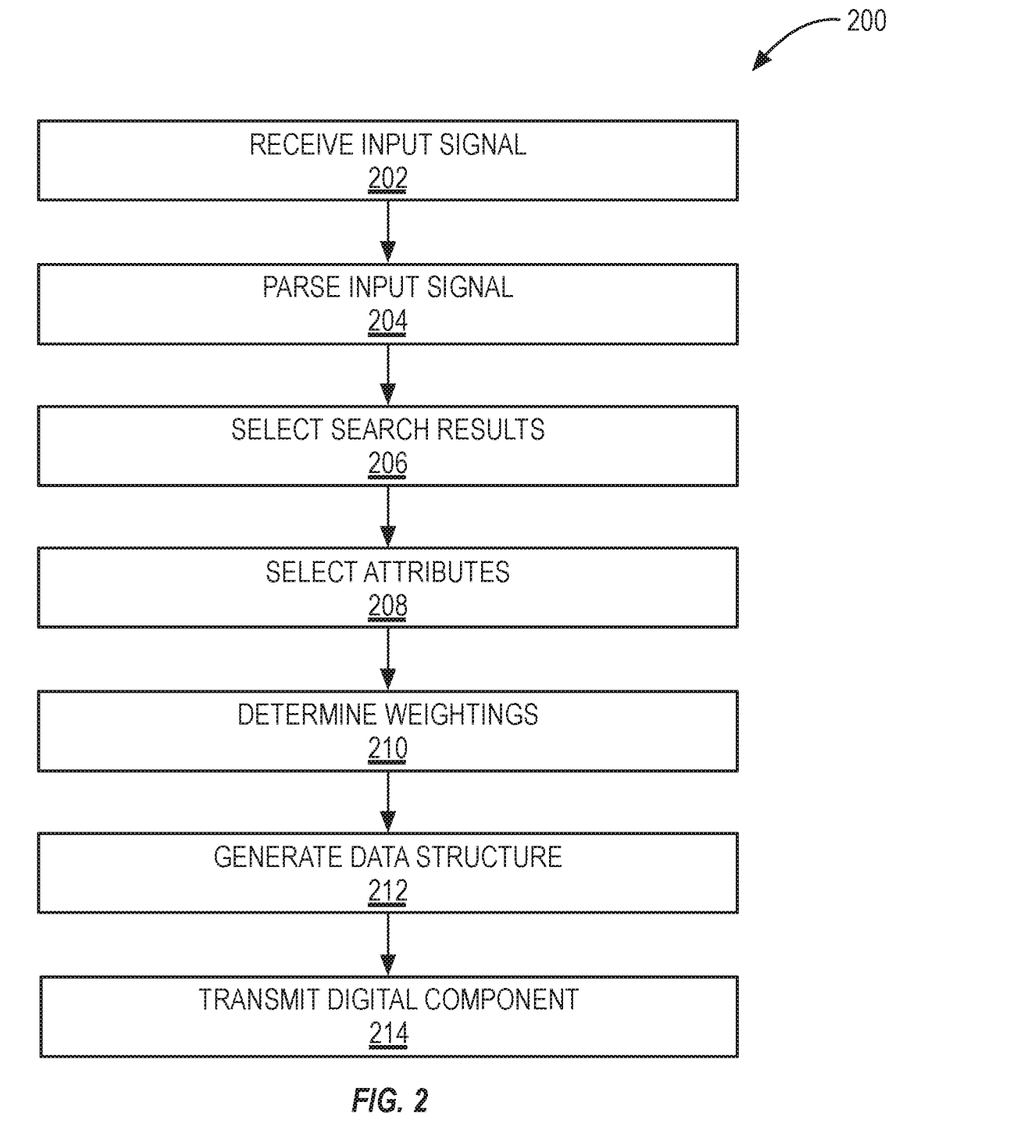
FIG. 2 illustrates a flow diagram of an example method to select attributes for search results in the system illustrated in FIG. 1.

FIG. 2 illustrates a flow diagram of an example method 200 to select attributes for search results. The method 200 can include receiving an input signal (ACT 202). The method 200 can include parsing the input signal (ACT 204). The method 200 can include selecting search results (ACT 206). The method 200 can include selecting attributes (ACT 208). The method 200 can include determining weightings (ACT 210). The method 200 can include generating data structures (ACT 212). The method 200 can include transmitting digital component (ACT 214).

As set forth above, the method 200 can include receiving an input signal (ACT 202). Also, referring to FIG. 1, among others, the input signal can be an audio-based input signal that is received at an interface 110 of the data processing system 102 from a client computing device 104. For example, a user of the client computing device 104 can ask a question to the client computing device 104 as an audio input. The transducer 142 (e.g., a microphone) of the client computing device 104 can detect the audio input and convert the audio input into a digitized signal. The pre-processor 148 can perform initial audio filtering of the digitized signal. The client computing device 104 can packetized the digitized signal and transmit the signal to the interface 110 of the data processing system 102 as an input signal.

The method 200 can include parsing the input signal (ACT 204). The NLP component 112, executed by the data processing system 102, can parse the input signal to identify a search request in the input signal. The NLP component 112 can identify a trigger keyword in the input signal that can indicate actions associated with the search request.

The method 200 can include selecting search results (ACT 206). The content selector component 118 can select one or more search results based on the search request identified by the NLP component 112. For example, the search request "I need a plumber," the content selector component 118 can perform a search of indexed web pages stored as content data 128 to identify the web pages of a plurality of different plumbers. The content selector component 118 can rank the search results. The search results can be ranked, for example, based on an identification of each web page's importance. The importance of a web page can be based on a number of times other web pages include links to the web page. The content selector component 118 can select the search results from search results returned from a searching data processing system via the direct action API 116.

The method 200 can include selecting attributes (ACT 208). The attribute selector component 113 can select one or more attributes for each of the search results identified by the content selector component 118. The attributes can be characteristics, qualities, metadata or other information associated with a search result. For example, the attributes can include a store or other address, an offer, an opening time, a closing time, a license, a certificate, a service, a specialization, a capability, or a rating associated with the search result.

The method 200 can include determining weightings for the attributes (ACT 210). The attribute selector component 113 can determine a plurality of weightings for each of the attributes. For example, the attribute selector component 113 can determine a first weighting that is associated with a search context and a second weighting that is associated with a client device context. The attribute selector component 113 can determine a score based on each of the plurality of weightings.

Figure 3:
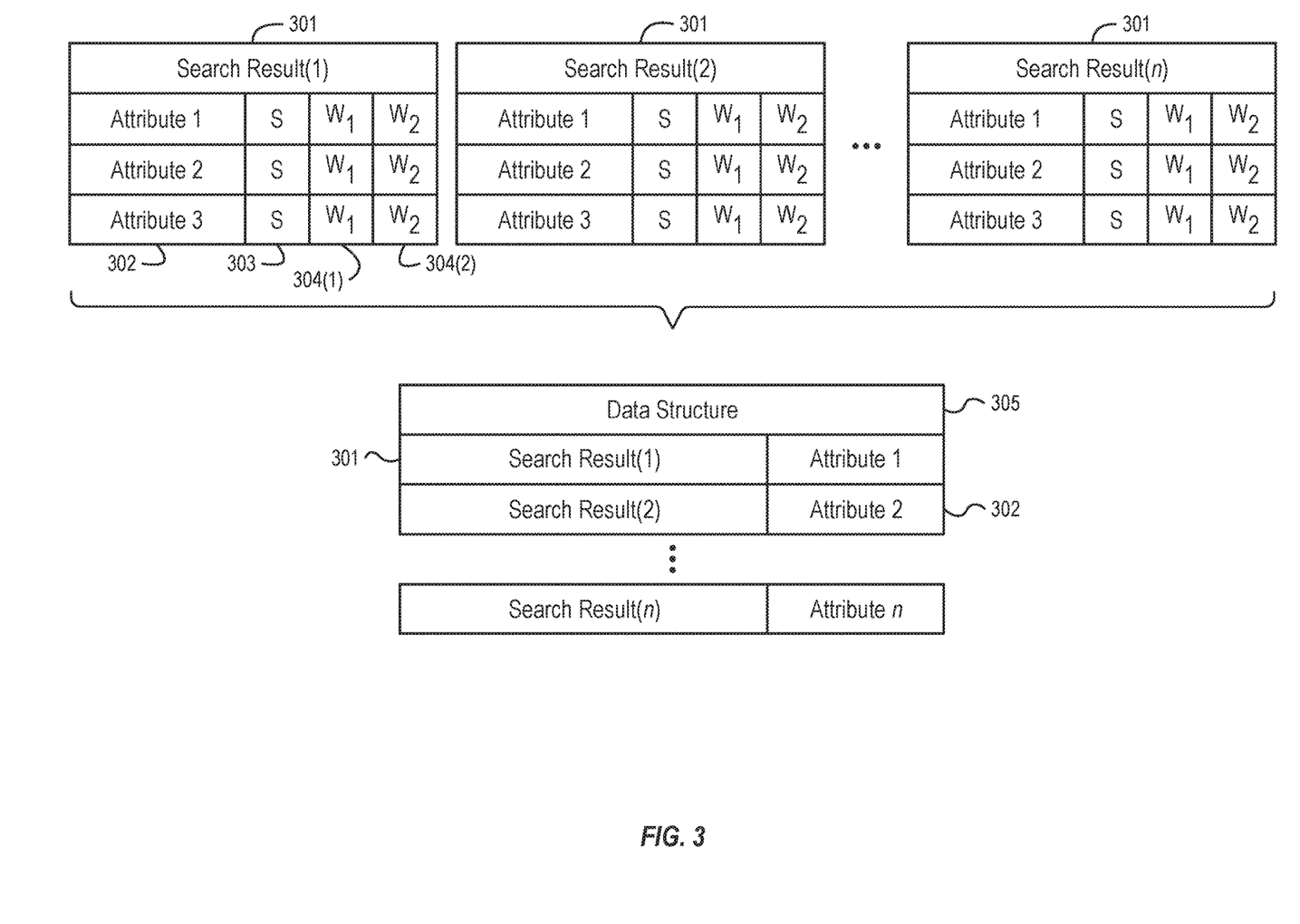
FIG. 3 illustrates a block diagram of a plurality of ranked search resulted being converted into a data structure.

For example, and referring to FIG. 3 among others, the content selector component 118 can determine a plurality of search results 301. FIG. 3 illustrates a block diagram of a ranking of the search results 301 being converted into a data structure. The content selector component 118 can rank the search results 301 and generate a ranked list of search results from search result(1), to search result(2), and to search result(n), where n is the number of search results. For each attribute 302, the attribute selector component 113 can determine a first weighting 304(1) and a second weighting 304(2), which can generally be referred to as weightings 304. The attribute selector component 113 can determine more than two weightings 304. For example, for each of a plurality of a user's preferences, the attribute selector component 113 can determine a different weighting 304 that maps the attribute to each of the user's preferences.

The attribute selector component 113 can select one or more attributes for each of the search results to include in a data structure. To select the attributes, the attribute selector component 113 can generate a score 303 for each of the attributes. The score 303 for a given attribute 302 can be based on the weightings 304. For example, the attribute selector component 113 can sum, average, or otherwise combine each of the weightings 304 for a given attribute 302 to calculate the score 303 for the attribute 302. For each search result, the attribute selector component 113 can select a predetermined number of attributes having the highest scores. For example, the attribute selector component 113 can select the two attributes 302 with the highest scores to incorporate into the data structure 305.

The weightings 304 can be based on the ranking of the search results 301. Once the search results 301 are ranked, the attribute selector component 113 can adjust or assign weights based on the search rankings. For example, for each subsequent search result 301 lower in the list of search rankings, the attribute selector component 113 can assign a lesser weight to the search result's attributes 302 than for the attributes 302 for more highly ranked search results 301.

In some implementations, the weightings based on search result ranking are applied based on the both the value of the attributes 302 and the search result ranking. For example, the attribute can be given a penalty or lower weighting for lower ranked search results only when the attribute is selected for a higher ranked search result. For example, if highest ranked search result for a plumber has a business hours attribute of "open 24 hrs a day" and a second highest ranked search result for a plumber has a business hours attribute of "open on weekends," the attribute selector component 113 may not penalize the business hours attribute of the lower ranked search result because the value of the attribute is different from the value of business hours attribute of the higher ranked search result.

The method 200 can include generating a data structure (ACT 212). Also, referring to FIG. 3, among others, the data structure 305 can include each of the search results 301. The data structure 305 can include, for each of the search results 301, one or more attributes 302. The attribute selector component 113 can determine which attribute to associate with a given search result 301 for inclusion in the data structure 305. For example, the selection of the respective attributes 302 can be based on a ranking of the attributes 302 by their associated scores 303 and a ranking of the search results 301 by the content selector component 118.

The attribute selector component 113 can also select a number of attributes 302 to include for each of the search results 301. The attribute selector component 113 can select the same number for each of the search result 301. For example, the attribute selector component 113 can select a single attribute 302 for each of the search results 301. The attribute selector component 113 can select a different number for each of the attributes 302. For example, the attribute selector component 113 can select a greater number of attributes 302 to include in the data structure 305 for the search results 301 ranking higher in the search results. The number of attributes the attribute selector component 113 determines to include in the data structure 305 can be based on a client device context or search context. The data processing system 102 can determine the client device context based on a device type of the client computing device 104. For example, the attribute selector component 113 can select fewer attributes when the device type is a mobile device and can select more attributes when the device type is a home-based speaker system.

In some implementations, the attribute selector component 113 can include a rendering format for each attribute 302 in the data structure 305. The rendering format can indicate if the attribute 302 should be included in an audio-based output, an image-based output, or a combination thereof. For example, if the client computing device 104 includes speakers and a screen. The attribute selector component 113 can indicate, in the data structure, that the highest scoring attribute for each search result should be included in an audio-based output and the other attributes should be displayed on the client computing device's screen.

The audio signal generator component 120 can incorporate the data structure 305 into a digital component. The digital component can be a search results page, web page, audio-based file, or other type of content item. The digital component can include instructions for how the client computing device 104 should render the data structure. For example, the digital component can include a template that includes the order, layout, language, voice, or other information that the client computing device 104 should use to render the data structure.

The method 200 can include transmitting the data structure (ACT 214). The data processing system 102 can transmit the data structure to the client computing device 104 via the network 105. The data processing system 102 can transmit the data structure to the client computing device 104 in a digital component. Responsive to receiving the data structure the client computing device 104 can render the data structure (or digital component including the data structure) to the user of the client computing device 104. Rendering the data structure can include visually displaying images and/or generating output audio signals based on the contents of the data structure.

Figure 4:
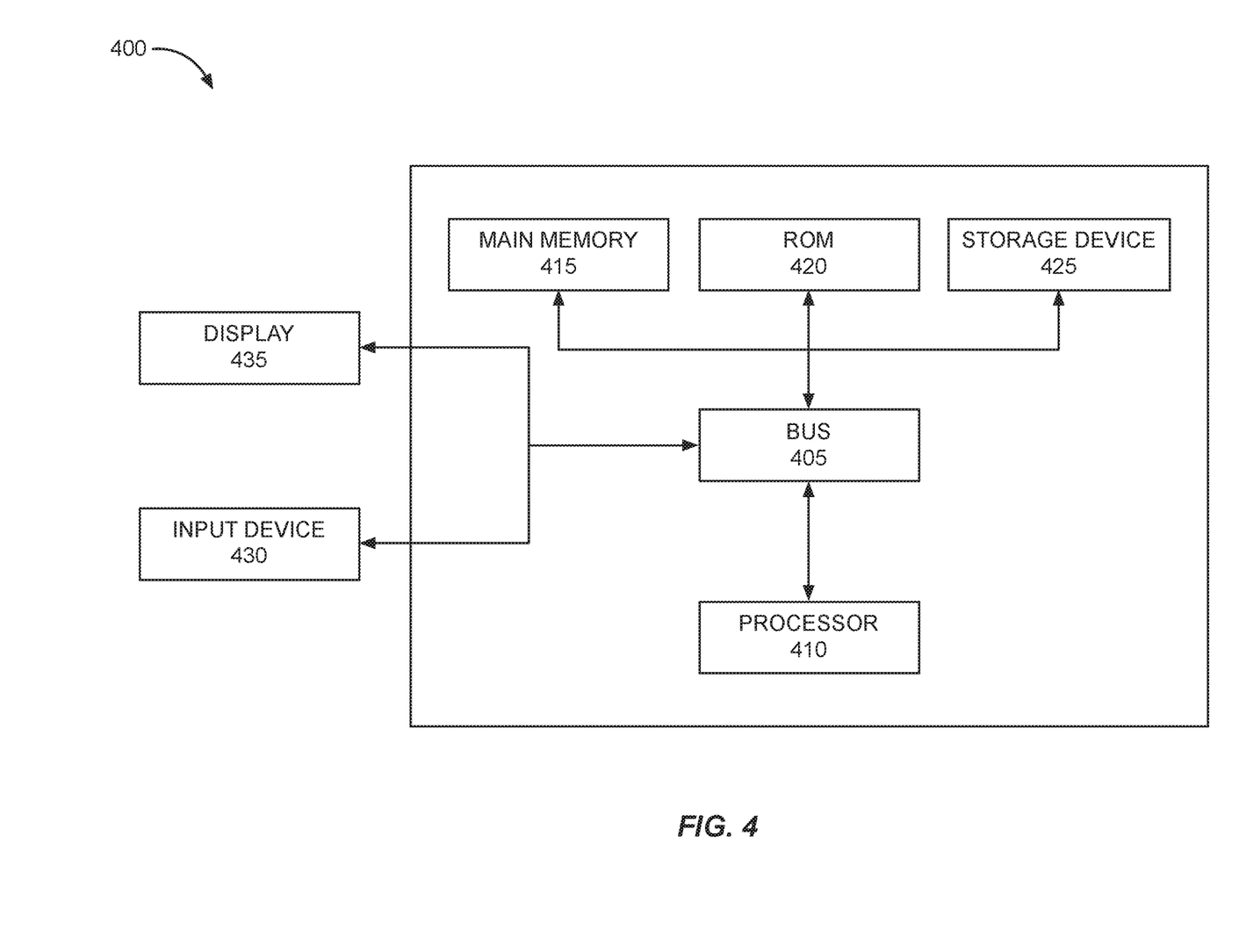
FIG. 4 is a block diagram illustrating a general architecture for a computer system that may be employed to implement elements of the systems and methods described and illustrated herein.

FIG. 4 is a block diagram of an example computer system 400. The computer system or computing device 400 can include or be used to implement the system 100 or its components such as the data processing system 102. The computing system 400 includes a bus 405 or other communication component for communicating information and a processor 410 or processing circuit coupled to the bus 405 for processing information. The computing system 400 can also include one or more processors 410 or processing circuits coupled to the bus for processing information. The computing system 400 also includes main memory 415, such as a random access memory (RAM) or other dynamic storage device, coupled to the bus 405 for storing information, and instructions to be executed by the processor 410. The main memory 415 can be or include the data repository 122. The main memory 415 can also be used for storing position information, temporary variables, or other intermediate information during execution of instructions by the processor 410. The computing system 400 may further include a read only memory (ROM) 420 or other static storage device coupled to the bus 405 for storing static information and instructions for the processor 410. A storage device 425, such as a solid state device, magnetic disk or optical disk, can be coupled to the bus 405 to persistently store information and instructions. The storage device 425 can include or be part of the data repository 122.

The computing system 400 may be coupled via the bus 405 to a display 435, such as a liquid crystal display, or active matrix display, for displaying information to a user. An input device 430, such as a keyboard including alphanumeric and other keys, may be coupled to the bus 405 for communicating information and command selections to the processor 410. The input device 430 can include a touch screen display 435. The input device 430 can also include a cursor control, such as a mouse, a trackball, or cursor direction keys, for communicating direction information and command selections to the processor 410 and for controlling cursor movement on the display 435. The display 435 can be part of the data processing system 102, the client computing device 104 or other component of FIG. 1, for example.

The processes, systems and methods described herein can be implemented by the computing system 400 in response to the processor 410 executing an arrangement of instructions contained in main memory 415. Such instructions can be read into main memory 415 from another computer-readable medium, such as the storage device 425. Execution of the arrangement of instructions contained in main memory 415 causes the computing system 400 to perform the illustrative processes described herein. One or more processors in a multi-processing arrangement may also be employed to execute the instructions contained in main memory 415. Hard-wired circuitry can be used in place of or in combination with software instructions together with the systems and methods described herein. Systems and methods described herein are not limited to any specific combination of hardware circuitry and software.

Although an example computing system has been described in FIG. 4, the subject matter including the operations described in this specification can be implemented in other types of digital electronic circuitry, or in computer software, firmware, or hardware, including the structures disclosed in this specification and their structural equivalents, or in combinations of one or more of them.

For situations in which the systems discussed herein collect personal information about users, or may make use of personal information, the users may be provided with an opportunity to control whether programs or features that may collect personal information (e.g., information about a user's social network, social actions or activities, a user's preferences, or a user's location), or to control whether or how to receive content from a content server or other data processing system that may be more relevant to the user. In addition, certain data may be anonymized in one or more ways before it is stored or used, so that personally identifiable information is removed when generating parameters. For example, a user's identity may be anonymized so that no personally identifiable information can be determined for the user, or a user's geographic location may be generalized where location information is obtained (such as to a city, postal code, or state level), so that a particular location of a user cannot be determined. Thus, the user may have control over how information is collected about him or her and used by the content server.

The subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. Alternatively, or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices). The operations described in this specification can be implemented as operations performed by a data processing apparatus on data stored on one or more computer-readable storage devices or received from other sources.

The terms "data processing system" "computing device" "component" or "data processing apparatus" encompass various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures. The direct action API 116, content selector component 118, attribute selector component 113, or NLP component 112 and other data processing system 102 components can include or share one or more data processing apparatuses, systems, computing devices, or processors.

A computer program (also known as a program, software, software application, app, script, or code) can be written in any form of programming language, including compiled or interpreted languages, declarative or procedural languages, and can be deployed in any form, including as a standalone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs (e.g., components of the data processing system 102) to perform actions by operating on input data and generating output. The processes and logic flows can also be performed by, and apparatuses can also be implemented as, special purpose logic circuitry, e.g., an FPGA (field programmable gate array) or an ASIC (application-specific integrated circuit). Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

The subject matter described herein can be implemented in a computing system that includes a back-end component, e.g., as a data server, or that includes a middleware component, e.g., an application server, or that includes a front-end component, e.g., a client computer having a graphical user interface or a web browser through which a user can interact with an implementation of the subject matter described in this specification, or a combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system such described herein can include clients and servers. A client and server are generally remote from each other and typically interact through a communication network (e.g., the network 105). The relationship of client and server arises by virtue of computer programs running on the respective computers and having a client-server relationship to each other. In some implementations, a server transmits data (e.g., data packets representing a digital component) to a client computing device (e.g., for purposes of displaying data to and receiving user input from a user interacting with the client computing device). Data generated at the client computing device (e.g., a result of the user interaction) can be received from the client computing device at the server (e.g., received by the data processing system 102 from the client computing device 104 or the content provider computing device 106).

While operations are depicted in the drawings in a particular order, such operations are not required to be performed in the particular order shown or in sequential order, and all illustrated operations are not required to be performed. Actions described herein can be performed in a different order.

The separation of various system components does not require separation in all implementations, and the described program components can be included in a single hardware or software product. For example, the NLP component 112, the content selector component 118, or attribute selector component 113 can be a single component, app, program, or a logic device having one or more processing circuits, or part of one or more servers of the data processing system 102.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, ele- ments, and features discussed in connection with one implementation are not intended to be excluded from a similar role in other implementations or implementations.

The phraseology and terminology used herein is for the purpose of description and should not be regarded as limiting. The use of "including," "comprising," "having," "containing," "involving," "characterized by," "characterized in that," and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation, element, or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations," "one implementation," or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence has any limiting effect on the scope of any claim elements.

The systems and methods described herein may be embodied in other specific forms without departing from the characteristics thereof. The foregoing implementations are illustrative rather than limiting of the described systems and methods. Scope of the systems and methods described herein is thus indicated by the appended claims, rather than the foregoing description, and changes that come within the meaning and range of equivalency of the claims are embraced therein.

What is claimed:

1. A system to provide digital components in a voice-activated system, comprising:
    a natural language processor component executed by a data processing system to:
        receive, via an interface, an input audio signal; and
        parse the input audio signal to identify a first search request in the input audio signal;
    a content selector component executed by the data processing system to select a plurality of search results based on the first search request;
    an attribute selector component executed by the data processing system to:
        determine a search context for the first search request;
        determine a plurality of attributes including information associated with each of the plurality of search results;
        determine a first weighting for each of the plurality of attributes for each of the plurality of search results based on the search context;
        determine a second weighting for each of the plurality of attributes for each of the plurality of search results based on a client device context; and
        select, for each of the plurality of search results, a subset of attributes from the plurality of attributes based on the first weighting for each of the plurality of attributes for each of the plurality of search results and the second weighting for each of the plurality of attributes for each of the plurality of search results; and
    an audio signal generation component executed by the data processing system to:
        generate a digital component that comprises a data structure having, for each of the plurality of search results, the subset of attributes selected from each of the plurality of attributes based on the first weighting for each of the plurality of attributes for each of the plurality of search results and the second weighting for each of the plurality of attributes for each of the plurality of search results; and
        transmit, via the interface, the digital component to a client device in response to the input audio signal.

2. The system of claim 1, comprising the data processing system to:
    rank the plurality of search results; and
    generate a third weighting for the plurality of attributes based on the ranking of the plurality of search results.

3. The system of claim 1, comprising the data processing system to:
    assign a first ranking to a first of the plurality of search results;
    assign a second ranking to a second of the plurality of search results;
    determine the first of the plurality of search results has a first attribute corresponding to a first attribute of the second of the plurality of search results; and
    apply a penalty weighting to the first attribute of the second of the plurality of search results based on the first attribute of the plurality of search results corresponding to the first attribute of the second of the plurality of search results.

4. The system of claim 1, comprising the data processing system to:
    assign a first ranking to a first of the plurality of search results;
    assign a second ranking to a second of the plurality of search results;
    determine the first of the plurality of search results has a first attribute corresponding to a first attribute of the second of the plurality of search results; and
    remove the first attribute of the second of the plurality of search results from the data structure based on the first attribute of the plurality of search results corresponding to the first attribute of the second of the plurality of search results.

5. The system of claim 1, comprising the data processing system to:
rank the plurality of attributes for each of the plurality of search results;
rank the plurality of search results; and
generate a score for the plurality of attributes for each of the plurality of search results based on the ranking of the plurality of attributes for each of the plurality of search results and the ranking of the plurality of search results.

6. The system of claim 1, comprising the data processing system to:
determine a number of attributes based on the client device context; and
select the number of attributes for each of the plurality of search results.

7. The system of claim 1, comprising the data processing system to:
determine a number of attributes for each of the plurality of search results; and
select the number of attributes for the plurality of search results.

8. The system of claim 7, wherein the number of attributes for each of the plurality of search results is different.

9. The system of claim 1, wherein the plurality of attributes can include an indication of an address, an offer, an opening time, a closing time, a license, a certificate, a service, a specialization, a capability, or a rating.

10. The system of claim 1, comprising the data processing system to:
select a first rendering format for the attribute selected from the plurality of attributes; and
select a second rendering format for a second selected attribute, wherein the second rendering format is different than the first rendering format.

11. A method to provide digital components in a voice-activated system, comprising:
receiving, by a natural language processor component executed by a data processing system and via an interface of the data processing system, an input audio signal;
parsing, by the natural language processor component, the input audio signal to identify a first search request in the input audio signal;
selecting, by a content selector component executed by the data processing system, a plurality of search results based on the first search request;
determining, by an attribute selector component executed by the data processing system, a search context for the first search request;
determining, by the attribute selector component, a plurality of attributes including information associated with each of the plurality of search results;
determining, by the attribute selector component, a first weighting for each of the plurality of attributes for each of the plurality of search results based on the search context;
determining, by the attribute selector component, a second weighting for each of the plurality of attributes for each of the plurality of search results based on a client device context;
selecting, by the attribute selector component and for each of the plurality of search results, a subset of attributes from the plurality of attributes based on the first weighting for each of the plurality of attributes for each of the plurality of search results and the second weighting for each of the plurality of attributes for each of the plurality of search results;
generating, by an audio signal generator component executed by the data processing system, a digital component that comprises a data structure having, for each of the plurality of search results, the subset of attributes selected from each of the plurality of attributes based on the first weighting for each of the plurality of attributes for each of the plurality of search results and the second weighting for each of the plurality of attributes for each of the plurality of search results; and
transmitting, by the audio signal generator component via the interface, the digital component to a client device in response to the input audio signal.

12. The method of claim 11, comprising:
ranking the plurality of search results; and
generating a third weighting for the plurality of attributes based on the ranking of the plurality of search results.

13. The method of claim 11, comprising:
assigning a first ranking to a first of the plurality of search results;
assigning a second ranking to a second of the plurality of search results;
determining the first of the plurality of search results has a first attribute corresponding to a first attribute of the second of the plurality of search results; and
adjusting a weighting of the first attribute of the second of the plurality of search results based on the first attribute of the plurality of search results corresponding to the first attribute of the second of the plurality of search results.

14. The method of claim 11, comprising:
assigning a first ranking to a first of the plurality of search results;
assigning a second ranking to a second of the plurality of search results;
determining the first of the plurality of search results has a first attribute corresponding to a first attribute of the second of the plurality of search results; and
removing the first attribute of the second of the plurality of search results from the data structure based on the first attribute of the plurality of search results corresponding to the first attribute of the second of the plurality of search results.

15. The method of claim 11, comprising:
ranking the plurality of attributes for each of the plurality of search results;
ranking the plurality of search results; and
generating a score for the plurality of attributes for each of the plurality of search results based on the ranking of the plurality of attributes for each of the plurality of search results and the ranking of the plurality of search results.

16. The method of claim 11, comprising:
determining a number of attributes based on the client device context; and
selecting the number of attributes for each of the plurality of search results.

17. The method of claim 11, comprising:
determining a number of attributes for each of the plurality of search results; and
selecting the number of attributes for the plurality of search results.

18. The method of claim 17, wherein the number of attributes for each of the plurality of search results is different.

19. The method of claim 11, wherein the plurality of attributes can include an indication of an address, an offer, an opening time, a closing time, a license, a certificate, a service, a specialization, a capability, or a rating.

20. The method of claim 11, comprising:
   selecting a first rendering format for the attribute selected from the plurality of attributes; and
   selecting a second rendering format for a second selected attribute, wherein the second rendering format is different than the first rendering format.

* * * * *